Sept. 8, 1970 W. FIENI 3,527,404
DEVICE FOR REGULATING A REDUCED PNEUMATIC DEPRESSION
Filed April 16, 1968 4 Sheets-Sheet 1

INVENTOR
WALTER FIENI
BY Hame and Baxley
ATTORNEYS

Sept. 8, 1970  W. FIENI  3,527,404
DEVICE FOR REGULATING A REDUCED PNEUMATIC DEPRESSION
Filed April 16, 1968  4 Sheets-Sheet 2
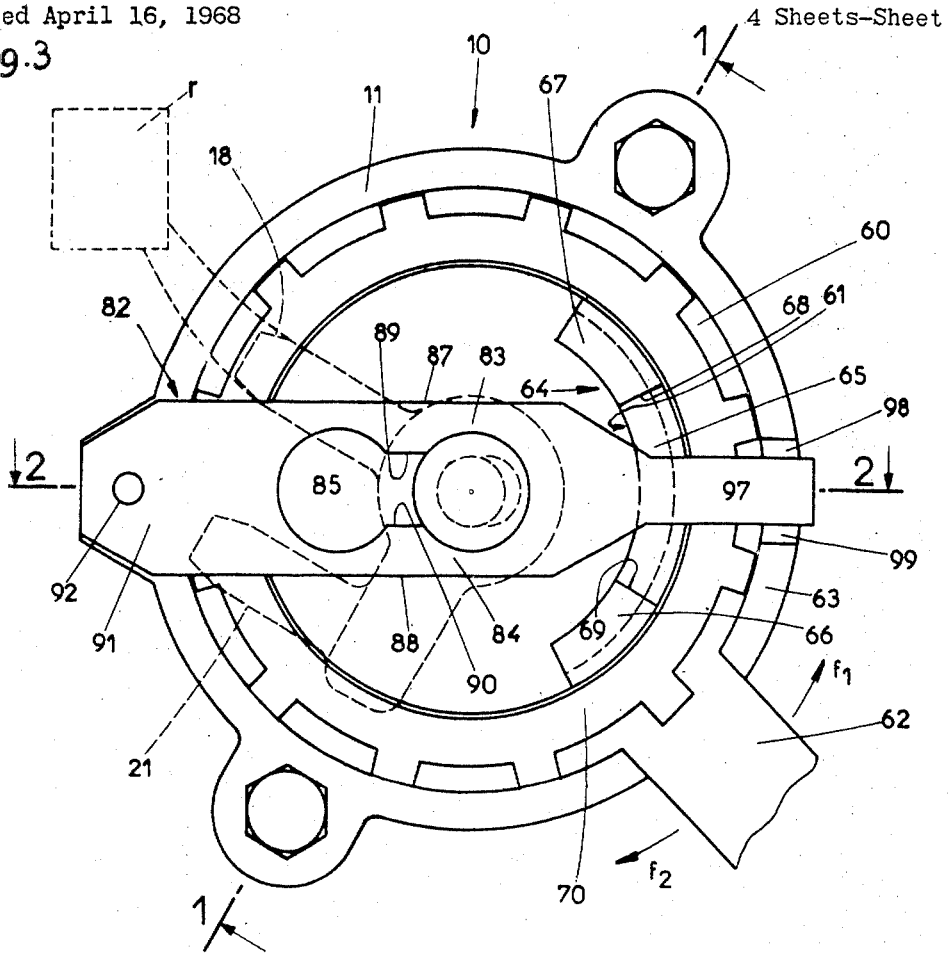
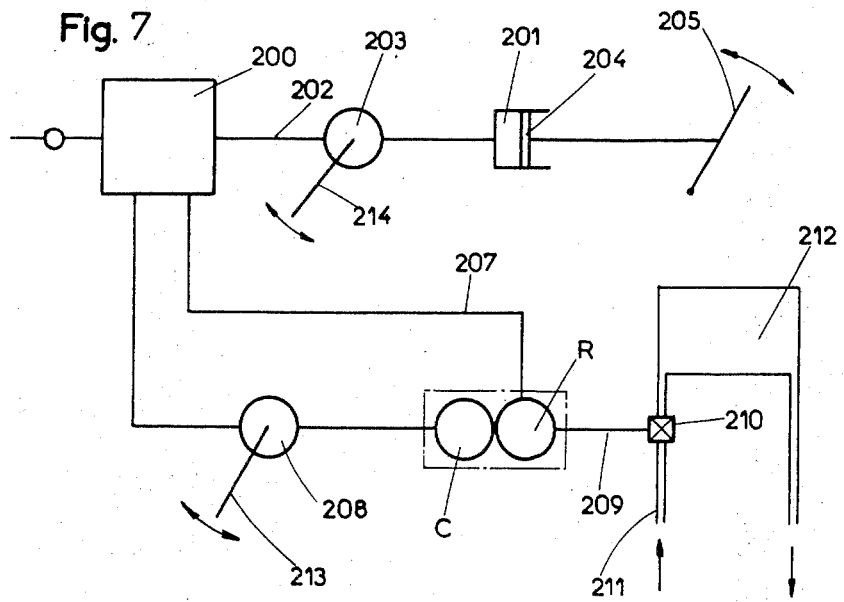
INVENTOR
WALTER FIENI
BY Hone and Baxley
ATTORNEYS

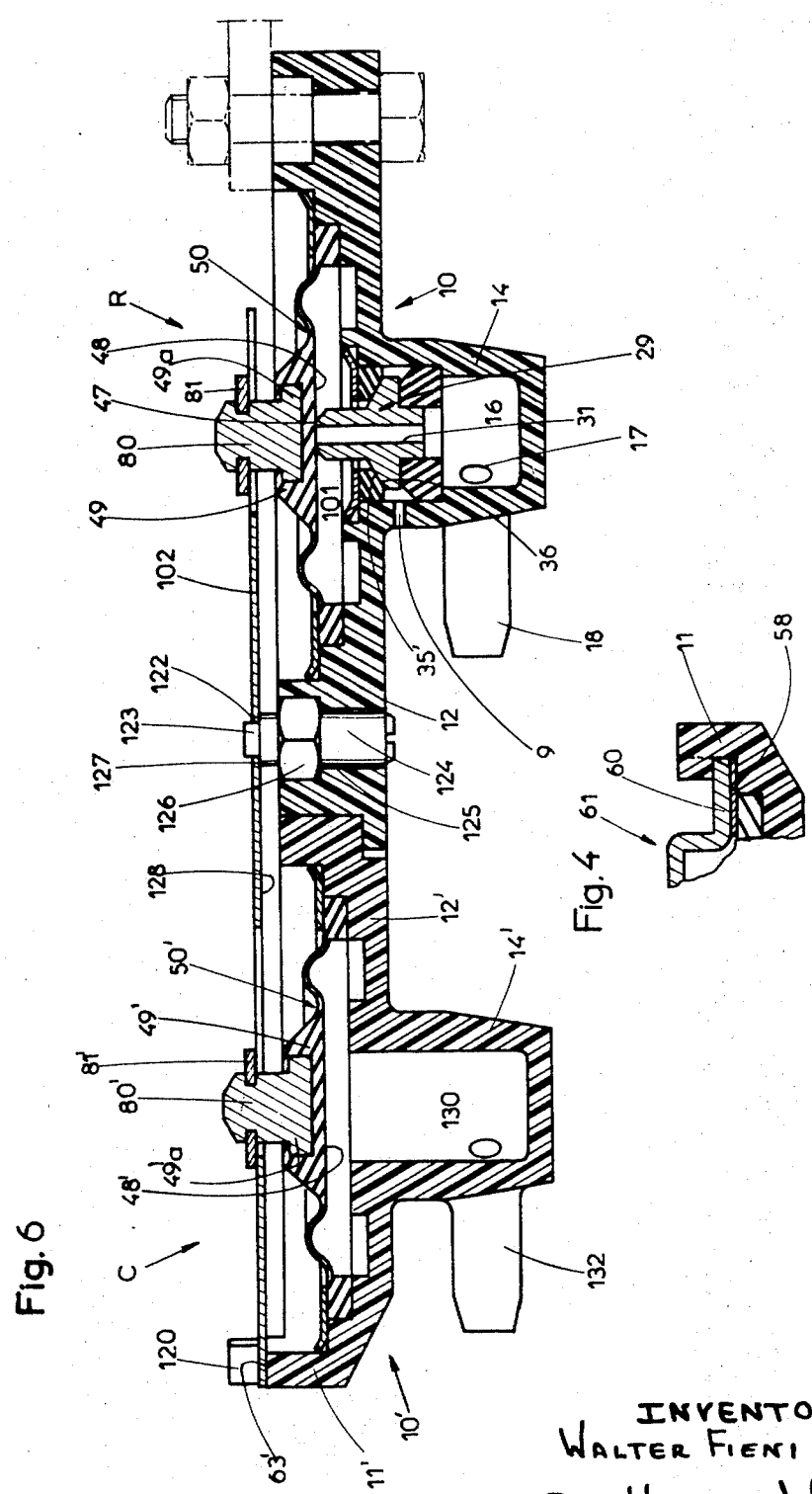

Sept. 8, 1970          W. FIENI          3,527,404

DEVICE FOR REGULATING A REDUCED PNEUMATIC DEPRESSION

Filed April 16, 1968          4 Sheets-Sheet 4

INVENTOR
WALTER FIENI
BY Hane and Baxley
ATTORNEYS

United States Patent Office 3,527,404
Patented Sept. 8, 1970

3,527,404
DEVICE FOR REGULATING A REDUCED
PNEUMATIC DEPRESSION
Walter Fieni, Paris, France, assignor to Societe Anonyme
Francaise du Ferodo, Paris, France
Filed Apr. 16, 1968, Ser. No. 721,782
Claims priority, application France, Apr. 20, 1967,
103,545
Int. Cl. G05d 27/00
U.S. Cl. 236—92                                    10 Claims

ABSTRACT OF THE DISCLOSURE

A device for regulating a reduced pneumatic pressure comprising an inlet connected to a source of reduced pneumatic pressure and an outlet connected to a device actuated by reduced pressure, the output reduced pressure prevailing in a chamber adapted to be connected to the source of reduced pressure or to the atmosphere according to the position of a movable diaphragm forming a portion of the wall of said chamber and on which the adjustable action of a spring is exerted in the opposite direction to that of the action of the output reduced pressure, the bringing of said chamber into communication with the source of reduced pressure or with the atmosphere being controlled by a valve traversed by a passage which affords the communication between the chamber and said source, the seat of the valve controlling the communication between the chamber and the atmosphere.

The invention relates to a device for regulating a reduced pneumatic perssure, or depression.

Devices are known which have an inlet connected to a reduced pneumatic pressure tank and an outlet connected to an apparatus actuated by reduced pressure and which enable definite reduced pressure values to be obtained at said outlet which values may vary continuously between a maximum value corresponding to that of the tank and a very low value, without any gas necessarily having to be delivered. It is an object of the intention to provide such a device which is small in dimensions, simple and economical in construction and easy to actuate.

In this connection, it is an object of the invention to provide such a device which can be controlled manually and/or automatically depending on a temperature.

In general, it is an object of the invention to provide such a device which may be used advantageously in an air-conditioning installation for a motor vehicle.

According to the invention, the device for regulating a reduced pneumatic pressure, which comprises an inlet connected to a reduced pneumatic pressure tank and an outlet connected to a device actuated by reduced pressure, the outgoing reduced pressure prevailing in a chamber adapted to be connected to the reduced pressure tank or to the atmosphere according to the position of a movable diaphragm forming part of the wall of said chamber and on which is exerted the adjustable action of a spring the action of which is counter to that of the outgoing reduced pressure, is characterised in that the bringing of said chamber into communication with the incoming reduced pressure tank or the atmosphere is controlled by a valve drilled with a passage which ensures the communication between the chamber and the reduced pressure tank while the seat of the valve controls the communication between the chamber and the atmosphere.

The invention will be well understood by the following description, given by way of example, with reference to the accompanying drawing in which:

FIG. 3 is a plan view of the device according to the invention;

FIG. 4 is a partial view, in section, of a portion of a modification;

FIG. 6 is a view in section on the line 6—6 in FIG. 5;

FIG. 7 is a diagram of a regulating installation using devices according to the invention.

Figure 1:
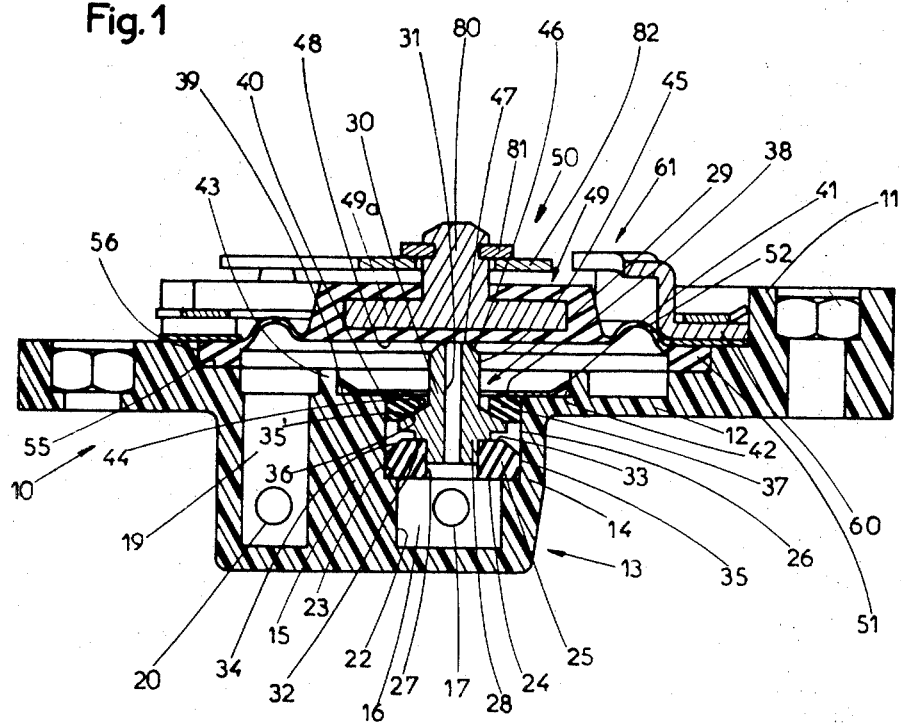
FIG. 1 is a view in section on the line 1—1 in FIG. 3 of a device according to the invention.
Figure 2:
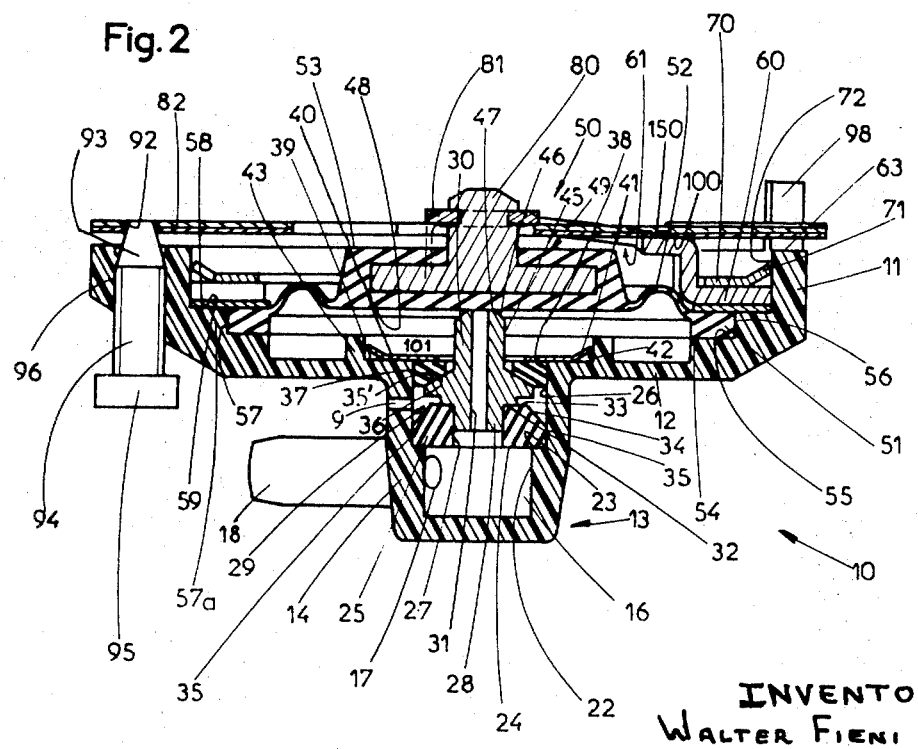
FIG. 2 is a view in section on the line 2—2 in FIG. 3.

Reference will first be made to FIGS. 1 to 3. In the form of construction illustrated, the device comprises a body 10, generally of plastic, but which may be metal, and which is substantially dish-shaped, with a rim 11 and a bottom 12, the latter having a lower boss 13 comprising a central core 14 and a radial extension 15. The core 14 forms a chamber 16 into which there leads, through an aperture 17, a connecting piece 18 (FIG. 3) which can be connected by a tube, preferably flexible, for example of polyvinyl, to a reduced pressure tank. In the radial extension 15 of the boss 13 there is formed a chamber 19 into which there leads, through an aperture 20, a connecting piece 21 which can be connected by a tube, preferably flexible, for example of polyvinyl, to an apparatus actuated by reduced pressure, for example a jack.

The lateral surface 22 of the chamber 16 comprises a shoulder 23 on which rests the lower face 24 of a ring 25, of soft rubber or another material having similar characteristics. The external lateral surface 35 of said ring is mounted in a leak-proof manner in a bore 26 in the core 14, having a larger diameter than that of the chamber 16 and into which there leads a bore 9 for communication with the atmosphere. Mounted in the aperture 27 in the ring 25 and sealed by its base 28 is a member for controlling the circulation of fluid or valve 29. This latter, made of metal or possibly of a hard plastics material, comprises a body 30 which is substantially cylindrical in shape and which is traversed by a central passage 31, the body 30 having an external shoulder 32 by which it bears against the upper face 33 of the ring 25, said face being connected by a frustoconical surface 34 to the external lateral surface 35 of the ring 25. The body 30 likewise comprises a frustoconical bearing surface 35′ adapted to cooperate with a frustoconical seat 36 comprised in a ring 37 of harder rubber than the rubber of the ring 25 and and forcefitted into the bore 26 in the core 14.

The upper face 38 of the ring 37 is brought into the same plane as the upper face 39 of the bottom 12 of the dish formed by the body 10, by the action of a washer 40 having a raised edge 41 bearing against the internal surface 42 of a circular rib 43 on the bottom 12. The aperture 44 in the ring 37 remains spaced apart from the opposite external lateral surface 45 of the body 30. The latter is terminated by a tapered lateral surface 46 connected to its annular end face 47.

Co-operating with the latter is the lower face 48 of the central protruding portion or boss 49 of a diaphragm device 50 which is substantially circular in shape and which comprises a peripheral bead 51 having a rectangular diametrical section and connected to the boss 49 by an annular portion 52 which is thin and flexible and forms a rounded fold or channel. The diameter of the boss 49 and its shape are selected in such a manner as to impart great rigidity thereto. A metal insert 49a embedded in the boss contributes to this rigidity as shown in FIGS. 1 and 2. The bead 51 is in contact by its lower face 54 with an annular surface 55 formed on the bottom 12 and by its lateral face 56 with the internal surface 57 of a shoulder 57a on the rim 11.

Fitted over the bead 51 is a washer 58 which likewise rests on an annular bearing surface 59 of the shoulder 57a, and on said washer 58 there rests the annular base 60 of a cam device 61. Rigidly connected to the base 60 is a radial arm 62 (FIG. 3) which rests on the upper face 63 of the rim 11. The operational part of the cam device consists of a caming surface 64 which comprises a slanted portion 65 connected, as shown at 68 and 69, to two horizontal portions, a lower one 66 and upper one 67 respectively. A washer 70 of resilient material, comprising a notched oblique margin 71 bears, by its periphery, against the internal surface 72 of the rim 11 and simultaneously, on the one hand ensures the holding of the cam 61 by bearing against its base 60, and on the other hand contributes to the holding of the diaphragm 50 by its bead 51 and to the sealing of the latter with respect to the edge of the dish.

In a modification, the base 60 of the cam 61 is held against the washer 58 by a bayonet fitting device shown diagrammatically in FIG. 4.

The upper portion of the diaphragm device 50 consists of the substantially cylindrical shaped end 80 of the insert 49a. A leaf spring 82 which may be a bi-metal spring as is indicated in FIG. 2 engages, with arms 83 and 84 bounding an aperture 85 which it comprises, round the end 80 of the insert 49a to which is fixed a circlip 81. The spring 82 is substantially rectangular in shape with its long sides 84 and 88 parallel to the sides 89 and 90 bounding the aperture 85; at one of its ends 91, it comprises a hole 92 and the latter is engaged over the frustoconical end 93 of a set screw 94 (FIG. 2) having a head 95 adapted to co-operate with a tapping 96 provided in the rim 11. The other, narrow end 97 of the spring 82 is engaged between two studs 98 and 99 comprised by the rim 11 and prevents any rotational displacement of the spring.

The operation is as follows:

For a given position of the arm 62, for example that shown in FIG. 3, the spring 82 co-operates, by its lower face 100, with a given portion 150 of the track 64 of the cam device 61 and, bearing against the end 93 of the screw 94, exerts an upward force on the diaphragm 50 which balances the action of the reduced pressure which is exerted on the diaphragm in the chamber 101 forming an extension of the chamber 19 situated below it. The resilient ring 25 holds the end face 47 of the member 29, which thus acts as a valve, applied against the lower face 48 of the diaphragm 50 and likewise holds the bearing surface 35′ applied against the sleeve 37, said member thus also acting as a valve; the chamber 101 is thus sealed and the reduced pressure value corresponding to this position of the arm 62 is transmitted to the apparatus actuated by reduced pressure which is connected to the chamber 19 by the connecting piece 21 to which there is attached a flexible tube.

If the reduced pressure prevailing in the chamber 101 exceeds said reduced pressure value, the boss 49 is lowered, entraining the member 29 in its movement and compressing the ring 25 in such a manner there is a narrow passage between the frustoconical seat 36 of the sleeve 37 and the bearing surface 35′ of said member, through which a small quantity of air enters the chamber 101 through the port 9 (FIG. 2) provided in the wall of the core 14. The reduced pressure value is thus diminished and contact is restored between the frustoconical seat 36 and the bearing surface 35′ because of the resilient action of the ring 25. The reduced pressure in the chamber 101 is thus restored to said reduced pressure or depression value.

It the reduced pressure prevailing in the chamber 101 becomes less than said reduced pressure value, the spring 82 urges the diaphragm device 50 upwards by bearing against the circlip 81. The lower face 48 of the boss 49 moves away from the annular end face 47 of the member 29 which brings the chamber 101 into communication, through the central passage 31 in said member, with the chamber 16 in which the maximum reduced pressure value prevails because of the connection with the tank through the connecting piece 18. When the action of the reduced pressure in the chamber 101 enables the action of the spring 82 to be counterbalanced, the lower face 48 of the boss 49 again comes into contact with the annular face 47 of the member 29 and the communication between the chamber 101 and the reduced pressure tank is again interrupted; the required reduced pressure value then again prevails in said chamber.

When it is desired to vary the value of the reduced pressure controlling the apparatus actuated by reduced pressure, it is sufficient to manipulate the arm 62 in one direction or the other. For example, if the arm 62 is actuated in the direction of the arrow $f_1$, a lower portion of the ramp 65 of the cam 61 co-operates with the lower face 100 of the spring 82 and the upward force which it exerts on the diaphragm 50 is reduced; thus a fresh desired reduced pressure value is fixed, If the reduced pressure prevailing in the chamber 101 becomes greater than or lower than the new desired reduced pressure value, the adjustment of said reduced pressure to said new value is effected as indicatd above.

On the other hand, if the arm 62 is displaced in the direction of the arrow $f_2$, a higher portion of the slant 65 of the cam 61 comes into contact with the lower face 100 of the spring 82. The upward force which the latter exerts on the diaphragm 50 increases and this again corresponds to a fresh reduced pressure value for the control of the apparatus actuated by reduced pressure. If, in this new position of the arm 62, the reduced pressure prevailing in the chamber 101 deviates from the new value fixed, the adjustment of said value is effected in a similar manner to that explained above.

In every case, the value of the reduced pressure for a given position of the arm 62 of the cam 61 is adjusted by actuation of the set screw 94.

The rigidity of the diaphragm over a large proportion of its surface ensures its efficiency.

The leaf spring 82 may be in the form of a bi-metal strip by joining two strips having different coefficients of expansion. When such strip is immersed in a flow of air at a variable temperature, the spring action which it exerts on the diaphragm varies. The operation of the device may thus be controlled automatically depending on a temperature.

In another embodiment, not illustrated, the position of the support, at 93, for the spring 82 is caused to vary depending on temperature. Said support may, for example, consist of the movable member of a thermostatic chain, the other end of which is subject to the temperature of a fluid, for example of a fluid of which it is desired to control the flow by means of the device according to the invention depending on its own temperature.

The stiffness of the spring 82 and that of the material constituting the ring 25 as well as the ratio of the section of the member 29 on which the action of the reduced pressure of the tank is exerted to that of the face 48 of the diaphragm device 50 on which the action of the reduced pressure which prevails in the chamber 101 is exerted, are selected in such a manner that the variations in the value of the reduced pressure of the tank have substantially no influence on the reduced pressure which controls the apparatus actuated by reduced pressure. A spring 82 may be used, the stiffness of which is greater than that of the material constituting the ring 25.

In an embodiment which has produced satisfactory results, the ratio of the section of the face of the member 29 on which the action of the reduced pressure of the tank is exerted to that of the face 48 of the diaphragm device 50 was $\frac{1}{10}$. The ring 25, having a thickness of 2.5 mm., with an external diameter of 8 mm. and an internal diameter of 3 mm., was of a resilient material such that, under the action of a weight of 500 g. exerted on the member 29, this was displaced downwards by $\frac{4}{10}$ of a millimeter.

In another embodiment, the shoulder 23 on which the ring 25 rests has a smaller internal diameter than that illustrated in FIGS. 1 and 2, for example substantially equal to the diameter of the aperture 27 in said ring. The area on which the action of the reduced pressure of the tank is exerted is then small. In this embodiment, the stiffness of the material constituting the ring 25 may be less than that of the material in the previous form of construction. The ring may be composite, that is to say it may comprise a first portion of a material having relatively little stiffness, for example of foam rubber, and a second portion of greater stiffness.

Figure 5:
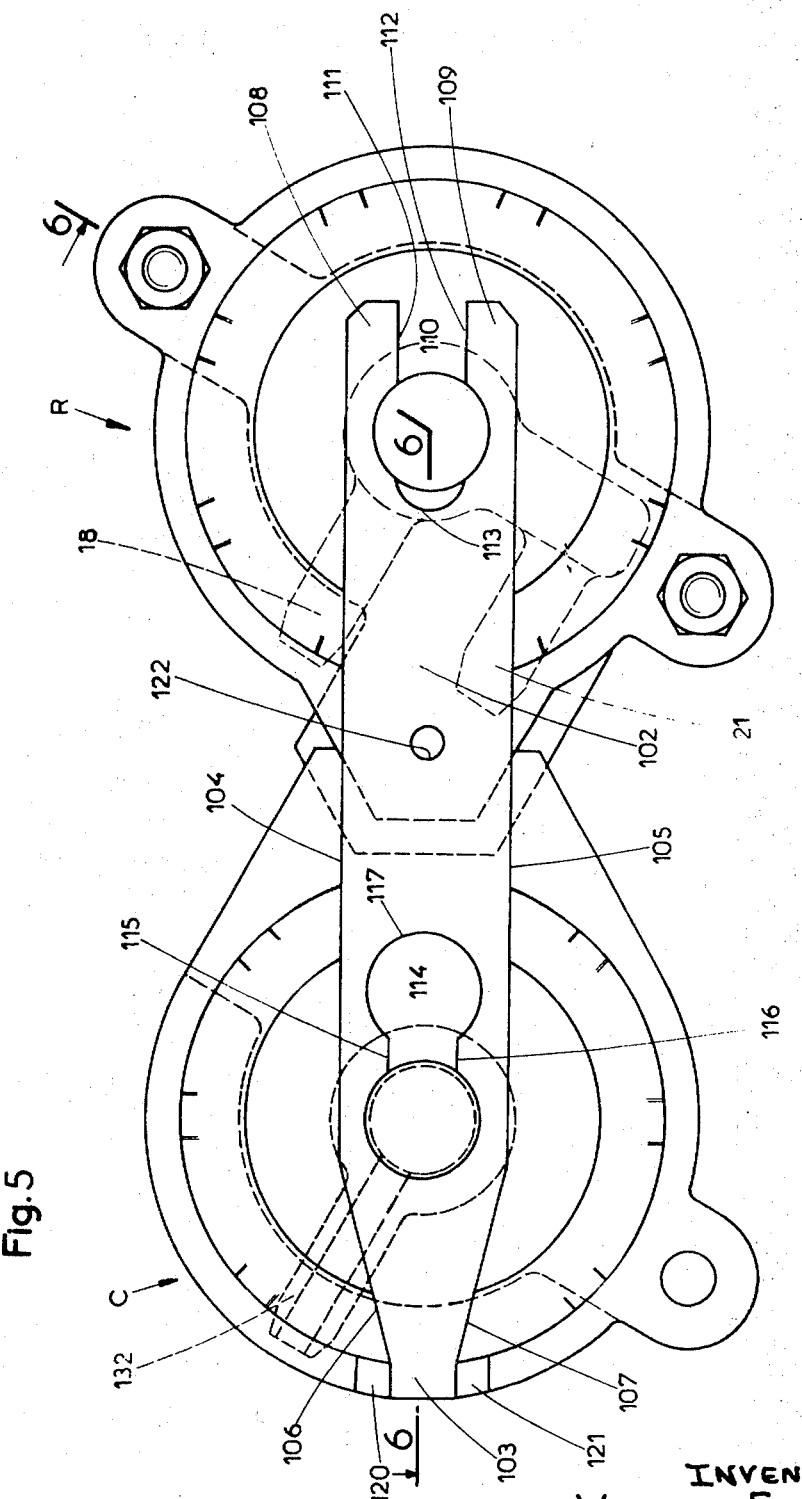
FIG. 5 is a plan view of a device according to the invention but for another form of construction.

Reference will now be made to FIGS. 5 and 6, relating to another form of construction. In this form of construction, the device comprises a reduced pressure regulator R similar to that which has just been described, which comprises the same members as this but with the exception of those which, in the latter, are adapted for adjusting the value of the regulated reduced pressure at will, that is to say the cam device; furthermore, the leaf spring is different. The identical members bear the same reference numerals as in the embodiment previously described.

Associated with said regulator, in this embodiment, is a device which, from a control reduced pressure, defines the input of said regulator, the output of which controls a member to be controlled.

A characteristic of this form of construction is that the last-mentioned device is composed of components of the regulator.

Said components of the device are likewise designated in the following description by the same reference numerals but primed.

The regulator R and the associated device or pneumatic control C are assembled to form a unit apparatus, the bodies 10 and 10' of the regulator and of the control respectively interengaging with their lower faces and their upper faces in the extension of one another or integral.

A single flat spring 102 exerts its action on the diaphragms 50 and 50' of the regulator R and of the control C respectively, by co-operating with the circlips 81 and 81' fixed to the ends 80 and 80' of the metal inserts 49a and 49a'. Said spring 102, constructed in the form of a bimetallic strip, has substantially the shape of an elongate rectangle and terminates at one end in a narrowed portion or foot 103 connected to the long sides 104 and 105 by oblique sides 106 and 107. The other end comprises two arms 108 and 109 (FIG. 5) forming a slot 110 with rectilinear sides 111 and 112 connected by a curved portion 113, and it is through the upper faces of said arms that the spring 102 co-operates with the lower face of the circlip 81. The co-operation of the spring 102 with the bass 49' of the diaphragm 50' of the control C is obtained in a similar manner to that in the embodiment previously described, through an aperture 114 provided in the spring 102 with two rectilinear sides 115 and 116 and a circular recess 117.

Through its foot 103, the spring bears against the upper face 63' of the rim 11' of the dish of the pneumatic control device C, stops 120 and 121 co-operating with the foot 103 preventing an angular displacement of the spring 102.

In its central portion, said spring comprises an aperture 122 in which there is engaged a stud 123 forming the end of a screw 124 adapted to co-operate with a tapped hole 123 formed in the body of the dish 12 of the regulator R; a nut 126 locates the position of the screw 124 which, at its upper portion, comprises an annular shoulder 127 on which rests the lower face 128 of the spring 102.

The chamber 130 comprised by the boss 14' integral with the body 12' of the dish of the pneumatic control device C is extended by a connecting piece 132 through which said chamber is brought into communication with an atmosphere in which a control reduced pressure or depression of adjustable value can be caused to prevail. For example, the connecting piece 132 may be brought into communication, by means of a flexible tube, with the outlet connecting piece 21 of a regulator of the type described with reference to FIGS. 1 to 3.

The connecting piece 18 communicating with the chamber 16 of the regulator R is connected to a primary source of vacuum, for example a tank, and the connecting piece 21 communicating with the chamber 101 of the regulator R is connected to an apparatus to be controlled, for example a valve controlled by reduced pressure.

The assembly is immersed in a medium, the temperature of which is to constitute a control factor.

The operation is as follows:

When the device is immersed in a medium at a constant temperature, the value of the reduced pressure which prevails in the chamber 101, and hence which is applied to the apparatus to be controlled, is that at which equilibrium is established between the various forces exerted on the diaphragm devices, namely the force resulting from this reduced pressure which is exerted in the chamber 101 on the lower face 48 of the diaphragm 50 of the regulator R, the force which is exerted on the lower face 48' of the diaphragm 50' of the pneumatic control device C and which depends on the value of the reduced pressure which prevails in the chamber 130, and the spring forces which are exerted on the diaphragms 50 and 50' by action on their pellets 49 and 49' respectively.

When the reduced pressure value prevailing in the chamber 130 is caused to vary, for example by action on a manually controlled regulator, for example of the type illustrated in FIGS. 1 to 3, to which the connecting piece 132 is connected, and if, for example, the reduced pressure in the chamber 130 is increased, the circlip 81' of the pneumatic control device C tends to bear more against the opposite portion of the spring 102. Since the bearing of said spring on the shoulder 127 constitutes a pivoting area, the portion of the spring opposite to that co-operating with the pneumatic control device tends to rise which raises the boss 49 of the diaphragm 50 of the regulator R. As a result of this rising, the face 48 of the diaphragm 50 of the regulator tends to move away from the end face 47 of the valve 29 and thus the chamber 101 of said regulator R is brought into communication, by means of the passage 31, with the primary vacuum; the reduced pressure value in the chamber 101 increases until it reaches the value at which equilibrium is again established; under these new circumstances, the communication between said chamber and the primary source is again interrupted by application of the lower face 48 of the diaphragm 50 against the end face 47 of the valve 29.

A similar process occurs when the value of the reduced pressure in the chamber 130 is reduced; in this case, the valve 29 is urged downwards and the chamber 101 is brought temporarily into communication with the atmosphere through the gap which is now formed between the tapered bearing surface 35' of the valve 29 and the seat 36, as well as through the port 9 provided in the wall of the core 14. When the value of the reduced pressure in the chamber 101 has decreased until the state of equilibrium is again obtained, this communication is interrupted by application of the bearing surface 35' against the seat 36.

If the temperature of the medium in which the apparatus is immersed varies, for example increases, the bimetallic spring tends to bend further, exerting an increased lifting action on the boss 49 of the diaphragm 50 and, consequently, an increase in the reduced pressure in the connecting piece 21, through a process similar to that which has been described above in the case where the control factor was an increase of the depression in the chamber 130.

For a reduction in temperature of the medium in which the apparatus is immersed, it is a reduction in the reduced pressure which is caused in the connecting piece 21, through a reverse process. In a modification, when the temperature of the medium in which the apparatus is immersed increases, the spring tends to bend in such a manner as to exert an action which lowers the boss 49 of the diaphragm 50 and consequently causes a reduction in the reduced pressure in the connecting piece 21. For a reduction of the temperature in the medium in which the apparatus is immersed, it is therefore an increase in reduced pressure which is produced in the connecting piece 21, by a reverse process.

The invention provides modifications in which the mechanical connection between the diaphragms, while retaining its lever character, is obtained by means of a non-thermostatic member, not necessarily resilient, for example a sheet-metal strip, and it is on said strip that the action of a bimetallic strip is exerted.

Reference will now be made to FIG. 7. This figure shows diagrammatically a reduced-pressure regulating system for controlling the air-conditioning of a motor vehicle. The reduced-pressure tank 200 is connected to a jack 201 by means of a pipeline 202 in which is connected a regulator 203 of the type shown in FIGS. 1 to 3. The movable member 204 of the jack is mechanically connected to a shutter 205 controlling the circulation of the conditioned air.

The apparatus shown in FIGS. 5 and 6 is placed in the path of the conditioned air. The regulator R is connected through a pipe 207 to the reduced pressure tank 200. The control device C is connected to the reduced pressure tank 200 by means of a regulator 208 of the type illustrated in FIGS. 1 to 3. The output 209 of the apparatus R–C is connected to a valve 210 interposed in a water inlet pipe 211 to a radiator 212 passed by the air to be conditioned. The valve 210 is thus actuated on the one hand depending on the position of the control arm 213 of the regulator 208 and on the other hand depending on the temperature of the conditioned air in which the apparatus R–C is immersed. The position of the shutter 205 is controlled by the actuation of the arm 214 of the regulator 203.

What is claimed is:

1. A device for regulating a pneumatic depression, said device comprising in combination:
    a hollow body having an inlet connectable to a source of pneumatic depression and an outlet selectively connectable to the source of pneumatic depression or to the atmosphere, said body including a chamber communicating with said outlet and adapted to be connected to the source of pneumatic depression or to the atmosphere;
    a valve means disposed in said body for controlling the connection of said chamber by the position of the valve means, said valve means having a bearing surface and a shoulder and also including a passage for effecting connection between the chamber and the source of pneumatic depression;
    a movable diaphragm forming part of a wall of said chamber and supported at its periphery in said body;
    adjustable spring means for exerting upon said diaphragm an action opposite to that exerted upon said diaphragm by said source of pneumatic depression;
    a first resilient ring seated in said body and cooperating with said bearing surface to control the communication between said chamber and the atmosphere; and
    a second resilient ring cooperating with said shoulder to exert on the valve means an action opposite to that exerted by the source of pneumatic depression for isolating the inlet from the atmosphere.

2. The device as claimed in claim 1, wherein the communication between said chamber and said source of depression is controlled by abutment of an end of said passage against a portion of said diaphragm in the form of a rigid protrusion connected to a peripheral supporting bead by a peripheral flexible portion.

3. The device as claimed in claim 2, wherein a metal insert is embedded in said protrusion, said metal insert including a portion extending through the protrusion to which is fixed said spring means.

4. The device as claimed in claim 1, wherein said spring means is a leaf spring having one end bearing against said body and another end cooperating with means for adjusting the action of the spring means.

5. The device as claimed in claim 4, wherein the adjustment means include cam means having a circular camming surface of varying height mounted for rotation in said body and a radial arm for actuation of the cam means.

6. The device according to claim 5, and further comprising a resilient washer cooperating with a rim in said body and the base of the cam means for holding the cam means as well as sealing the periphery of said diaphragm.

7. The device according to claim 1, wherein said spring means is a bi-metallic leaf spring.

8. A device for regulating a pneumatic depression responsive to temperature, said device comprising in combination:
    a hollow body having a first chamber connectable to a first source of pneumatic depression; a first movable diaphragm forming part of a wall of the first chamber and supported at its periphery in said body,
    said body including an inlet connectable to a second source of pneumatic depression, and an outlet selectively communicating with the second source of pneumatic depression or to the atmosphere,
    said body also including a second chamber communicating with the outlet and adapted to be selectively connected to the second source of pneumatic depression or to the atmosphere;
    a valve means disposed in said body for controlling the connection of the second chamber by the position of the valve means, said valve means having a longitudinal passage for effecting communication of the second chamber with the second source of pneumatic depression, and also including a bearing surface and a shoulder;
    a second movable diaphragm forming part of a wall of said second chamber and supported at its periphery in said body;
    a first resilient ring seated in said body and cooperating with said bearing surface for controlling the communication between said second chamber and the atmosphere;
    a second resilient ring cooperating with said shoulder urging the valve means an action opposite to that exerted by the second source of pneumatic depression for isolating said inlet from the atmosphere; and temperature responsive spring means exerting on said first and second diaphragms an action opposite to that exerted by said first and second sources of pneumatic depression.

9. The device as claimed in claim 8, wherein the communication between said second chamber and said second source of pneumatic depression is controlled by abuttment of an end of said passage against said second diaphragm.

10. The device as claimed in claim 8, wherein the temperature responsive spring means is a bi-metallic leaf spring connected to said first and second diaphragms, said spring having an end bearing against said body and a central portion bearing against a support of variable height.

References Cited

UNITED STATES PATENTS

| | | | |
|---|---|---|---|
| 2,868,459 | 1/1959 | Modes | 236—87 |
| 3,150,856 | 9/1964 | Deibel et al. | 137—627.5 X |
| 3,221,991 | 12/1965 | Houser | 236—87 |
| 3,436,017 | 4/1969 | Elmer | 137—627.5 X |

WILLIAM E. WAYNER, Primary Examiner

U.S. Cl. X.R.

137—505.42; 236—87